(12) United States Patent
Nihei

(10) Patent No.: US 11,509,917 B2
(45) Date of Patent: Nov. 22, 2022

(54) DATA DELIVERY DEVICE, SYSTEM, METHOD, AND RECORDING MEDIUM

(71) Applicant: NEC Corporation, Tokyo (JP)

(72) Inventor: Koichi Nihei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 318 days.

(21) Appl. No.: 16/629,655

(22) PCT Filed: Jul. 13, 2018

(86) PCT No.: PCT/JP2018/026543
§ 371 (c)(1),
(2) Date: Jan. 9, 2020

(87) PCT Pub. No.: WO2019/017298
PCT Pub. Date: Jan. 24, 2019

(65) Prior Publication Data
US 2021/0409740 A1 Dec. 30, 2021

(30) Foreign Application Priority Data
Jul. 19, 2017 (JP) .............................. JP2017-140107

(51) Int. Cl.
*H04N 19/37* (2014.01)
*H04N 19/164* (2014.01)
(Continued)

(52) U.S. Cl.
CPC ........... *H04N 19/37* (2014.11); *H04N 19/164* (2014.11); *H04N 21/23655* (2013.01); *H04N 21/2662* (2013.01); *H04N 21/26216* (2013.01)

(58) Field of Classification Search
CPC ................. H04N 19/37; H04N 19/164; H04N 21/26216; H04N 21/2662
See application file for complete search history.

(56) References Cited

U.S. PATENT DOCUMENTS 8,572,670 B2 * 10/2013 Asami ................ H04N 21/6587
725/136
2006/0129909 A1 * 6/2006 Butt .................. H04N 21/85406
348/E7.071
(Continued)

FOREIGN PATENT DOCUMENTS

JP  2009-027598 A   2/2009
JP  2013-219763 A   10/2013
(Continued)

OTHER PUBLICATIONS

International Search Report for PCT Application No. PCT/JP2018/026543, dated Oct. 9, 2018.
(Continued)

*Primary Examiner* — Shawn S An
(74) *Attorney, Agent, or Firm* — Sughrue Mion, PLLC

(57) ABSTRACT

[Problem] In order to improve the likelihood of being able to continue delivery even during degradation of communication quality and improve the efficiency of use of the capability of a transmission path, even with hierarchical encoding having a small number of hierarchies, the present invention comprises: measuring the communication quality of the transmission path with a data receiving device; determining a hierarchical structure of hierarchical data on the basis of the results of measuring the communication quality; generating the hierarchical data of the hierarchical structure by hierarchical encoding of input data; and delivering delivery data of at least some hierarchies of the hierarchical data to the data receiving device.

13 Claims, 16 Drawing Sheets

(51) Int. Cl.
  *H04N 21/2365* (2011.01)
  *H04N 21/262* (2011.01)
  *H04N 21/2662* (2011.01)

(56) References Cited

U.S. PATENT DOCUMENTS

| | | | | |
|---|---|---|---|---|
| 2012/0263226 | A1* | 10/2012 | Inohiza | H04N 19/37 |
| | | | | 375/240.02 |
| 2013/0195202 | A1* | 8/2013 | Cheon | H04N 19/119 |
| | | | | 375/240.25 |
| 2013/0243082 | A1 | 9/2013 | Bogus et al. | |
| 2014/0301458 | A1* | 10/2014 | Rapaka | H04N 19/31 |
| | | | | 375/240.12 |
| 2015/0036733 | A1* | 2/2015 | Smadi | H04N 21/44 |
| | | | | 375/240.01 |
| 2015/0180740 | A1 | 6/2015 | Yoshida | |
| 2015/0264100 | A1* | 9/2015 | Ohbitsu | H04L 67/32 |
| | | | | 709/219 |
| 2015/0281691 | A1 | 10/2015 | Takehara et al. | |
| 2018/0160161 | A1* | 6/2018 | Reznik | H04N 21/8456 |
| 2018/0192112 | A1* | 7/2018 | Bloemheuvel | H04N 21/2343 |
| 2019/0007676 | A1* | 1/2019 | Katsumata | G06T 1/00 |

FOREIGN PATENT DOCUMENTS

| | | |
|---|---|---|
| JP | 2015-195474 A | 11/2015 |
| WO | 2014/007166 A1 | 1/2014 |
| WO | 2016/042686 A1 | 3/2016 |

OTHER PUBLICATIONS

English translation of Written opinion for PCT Application No. PCT/JP2018/026543.
Pantos & May "HTTP Live Streaming draft-pantos-http-live-streaming-20", IETF Internet Draft, Sep. 2016, USA.

* cited by examiner

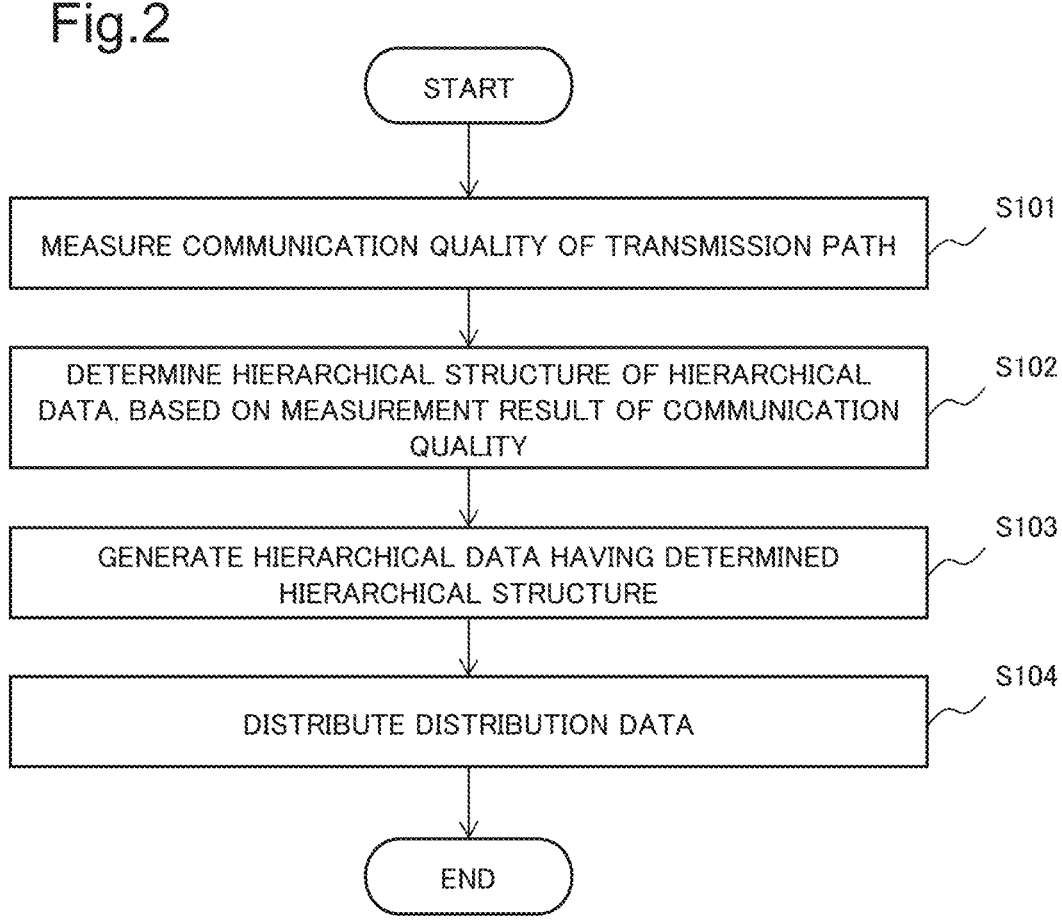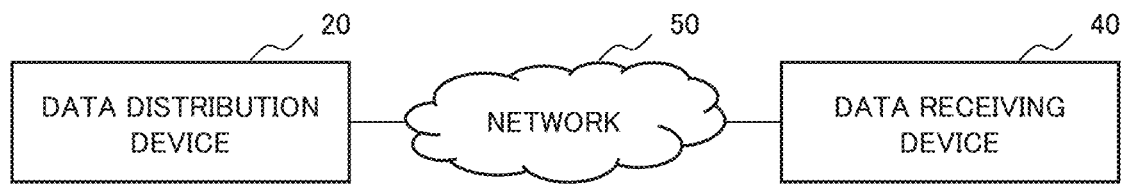

Fig.9

| TIME t [s] | 1 | 2 | 3 | 4 | 5 | 6 | 7 | 8 | 9 | 10 |
|---|---|---|---|---|---|---|---|---|---|---|
| THROUGHPUT Th [Mbps] | 2.61 | 2.91 | 2.42 | 2.82 | 3.35 | 2.75 | 2.60 | 2.11 | 1.97 | 2.31 |

| TIME t [s] | 11 | 12 | 13 | 14 | 15 | 16 | 17 | 18 | 19 | 20 |
|---|---|---|---|---|---|---|---|---|---|---|
| THROUGHPUT Th [Mbps] | 2.93 | 3.11 | 2.72 | 1.66 | 3.85 | 1.88 | 2.96 | 2.62 | 3.38 | 3.03 |

| TIME t [s] | 21 | 22 | 23 | 24 | 25 | 26 | 27 | 28 | 29 | 30 |
|---|---|---|---|---|---|---|---|---|---|---|
| THROUGHPUT Th [Mbps] | 4.00 | 2.40 | 3.14 | 3.64 | 2.31 | 3.89 | 3.75 | 3.57 | 2.85 | 1.24 |

Fig.10

| TIME t [s] | 11 | 12 | 13 | 14 | 15 | 16 | 17 | 18 | 19 | 20 |
|---|---|---|---|---|---|---|---|---|---|---|
| AVERAGE $\mu$ [Mbps] | 2.59 | 2.62 | 2.64 | 2.68 | 2.55 | 2.60 | 2.51 | 2.55 | 2.60 | 2.74 |
| STANDARD DEVIATION $\sigma$ [Mbps] | 0.38 | 0.40 | 0.42 | 0.41 | 0.50 | 0.60 | 0.63 | 0.65 | 0.63 | 0.63 |

| TIME t [s] | 21 | 22 | 23 | 24 | 25 | 26 | 27 | 28 | 29 | 30 |
|---|---|---|---|---|---|---|---|---|---|---|
| AVERAGE $\mu$ [Mbps] | 2.81 | 2.92 | 2.85 | 2.89 | 3.09 | 2.94 | 3.14 | 3.22 | 3.31 | 3.26 |
| STANDARD DEVIATION $\sigma$ [Mbps] | 0.62 | 0.71 | 0.73 | 0.73 | 0.63 | 0.61 | 0.56 | 0.59 | 0.56 | 0.57 |

Fig.11

| TIME t [s] | 11 | 12 | 13 | 14 | 15 | 16 | 17 | 18 | 19 | 20 |
|---|---|---|---|---|---|---|---|---|---|---|
| r3 [Mbps] | 2.31 | 2.93 | 3.11 | 2.72 | 1.66 | 3.85 | 1.88 | 2.96 | 2.62 | 3.38 |
| r2 [Mbps] | 1.93 | 2.53 | 2.69 | 2.31 | 1.16 | 3.25 | 1.25 | 2.31 | 1.99 | 2.75 |
| r1 [Mbps] | 1.55 | 2.13 | 2.28 | 1.90 | 0.65 | 2.65 | 0.62 | 1.67 | 1.36 | 2.12 |

| TIME t [s] | 21 | 22 | 23 | 24 | 25 | 26 | 27 | 28 | 29 | 30 |
|---|---|---|---|---|---|---|---|---|---|---|
| r3 [Mbps] | 3.03 | 4.00 | 2.40 | 3.14 | 3.64 | 2.31 | 3.89 | 3.75 | 3.57 | 2.85 |
| r2 [Mbps] | 2.41 | 3.29 | 1.67 | 2.41 | 3.01 | 1.70 | 3.33 | 3.16 | 3.01 | 2.28 |
| r1 [Mbps] | 1.79 | 2.57 | 0.95 | 1.68 | 2.38 | 1.08 | 2.77 | 2.58 | 2.45 | 1.70 |

Fig.15

| DISTRIBUTION LAYER | RESOLUTION | FRAME RATE [fps] | BIT RATE [Mbps] |
|---|---|---|---|
| LAYER 1 TO LAYER 3 | 1280 × 720<br>640 × 360 | 10 | 3.0 |
| LAYER 1 TO LAYER 2 | 640 × 360 | 10 | 1.5 |
| LAYER 1 | 640 × 360 | 5 | 1.0 |

DATA DELIVERY DEVICE, SYSTEM, METHOD, AND RECORDING MEDIUM

This application is a National Stage Entry of PCT/JP2018/026543 filed on Jul. 13, 2018, which claims priority from Japanese Patent Application 2017-140107 filed on Jul. 19, 2017, the contents of all of which are incorporated herein by reference, in their entirety.

TECHNICAL FIELD

The present invention relates to a data distribution device, a system, a method, and a recording medium for distributing distribution data to a data receiving device.

BACKGROUND ART

In recent years, opportunities to distribute media data such as a video to a remote location through a network in real time have been increasing. In many cases, a network in which communication quality is not assured, such as the Internet or a wireless network, is used for such data distribution. For this reason, when a communication speed decreases, a media quality degradation (for example, disturbance, interruption, and the like of a video) occurs.

In contrast, in NPL 1 and the like, a technique of distributing media while switching quality of the media in response to a communication speed is proposed. Moreover, this technique is also standardized in International Organization for Standardization/International Electrotechnical Commission (ISO/IEC) 23009-1:2014.

Moreover, as a switching method of the quality of the media to be distributed, described in PTL 1 is a method in which a distribution server holds a hierarchically encoded video file, and distributes data in a part of layers in the video file on the basis of a communication throughput between the distribution server and a terminal.

Thus, the media quality degradation can be reduced even when the communication speed decreases.

CITATION LIST

Patent Literature

[PTL 1] Japanese Unexamined Patent Application Publication No. 2009-27598
[PTL 2] International Publication No. WO 2014/007166

Non Patent Literature

[NPL 1] "HTTP Live Streaming draft-pantos-http-live-streaming-20", IETF Internet Draft, September 2016

SUMMARY OF INVENTION

Technical Problem

However, in the method described in PTL 1, a video with an appropriate bit rate may not be distributed depending on a network environment.

In the method described in PTL 1, an optimum layer is selected from the hierarchically encoded video in advance, and the video is distributed. For this reason, when a communication throughput is lower than a bit rate of a layer with the lowest bit rate, the video cannot be distributed in real time. Moreover, when the communication throughput is much higher than a bit rate when all layers are used, a low-image-quality video is distributed even though there is an environment where a higher-image-quality video can be distributed.

The above-described problem can be solved when a distribution server holds a video file in a wide range of layers from that of a low bit rate to that of a high bit rate. However, when the number of layers increases, encoding efficiency decreases, and in addition, an encoding throughput increases to a large extent. For this reason, particularly in a live streaming in which a video is distributed while being encoded, a distribution server with a general processing capacity cannot encode the video file into many layers.

An object of the present invention is to provide a data distribution device, a system, a method, and a recording medium, which, even when the number of hierarchically encoded layers is small, make it possible to increase a possibility that distribution can be continued even when communication quality is degraded, and further, to increase utilization efficiency of a capability of a transmission path.

Solution to Problem

To solve the above-described problem, a data distribution device comprises:
communication quality measurement means for measuring communication quality of a transmission path to a data receiving device;
hierarchical structure determination means for determining a hierarchical structure of hierarchical data, based on a measurement result of the communication quality;
hierarchical encoding means for generating the hierarchical data having the hierarchical structure by hierarchically encoding input data; and
communication means for distributing distribution data in at least a part of layers of the hierarchical data to the data receiving device.

A data distribution method, according to the present invention, comprises:
measuring communication quality of a transmission path to a data receiving device;
determining a hierarchical structure of hierarchical data, based on a measurement result of the communication quality;
generating the hierarchical data having the hierarchical structure by hierarchically encoding input data; and
distributing distribution data in at least a part of layers of the hierarchical data to the data receiving device.

A computer-readable recording medium, according to the present invention, that records a data distribution program causing a computer to execute:
a communication quality measurement function of measuring communication quality of a transmission path to a data receiving device;
a hierarchical structure determination function of determining a hierarchical structure of hierarchical data, based on a measurement result of the communication quality;
a hierarchical encoding function of generating the hierarchical data having the hierarchical structure by hierarchically encoding input data; and
a communication function of distributing distribution data in at least a part of layers of the hierarchical data to the data receiving device.

Advantageous Effects of Invention

Even when the number of hierarchically encoded layers is small, the data distribution device, the system, the method, and the recording medium according to the present invention make it possible to increase the possibility that distribution can be continued even when communication quality is degraded, and further, to increase the utilization efficiency of a capability of a transmission path.

BRIEF DESCRIPTION OF DRAWINGS

FIG. 2 is a diagram illustrating an operation example of the data distribution device of the first example embodiment of the present invention.

FIG. 3 is a diagram illustrating a configuration example of a data distribution system of a second example embodiment of the present invention.

FIG. 9 is a diagram illustrating an example of measurement results of the communication throughput.

FIG. 10 is a diagram illustrating an example of average values and standard deviations of the communication throughput.

FIG. 11 is a diagram illustrating an example of bit rates of respective layers, which are determined by the data distribution device of the second example embodiment of the present invention.

FIG. 15 is a diagram illustrating a configuration example of hierarchical data by a data distribution device of a third example embodiment of the present invention.

EXAMPLE EMBODIMENT

First Example Embodiment

A first example embodiment of the present invention will be described.

Figure 1:
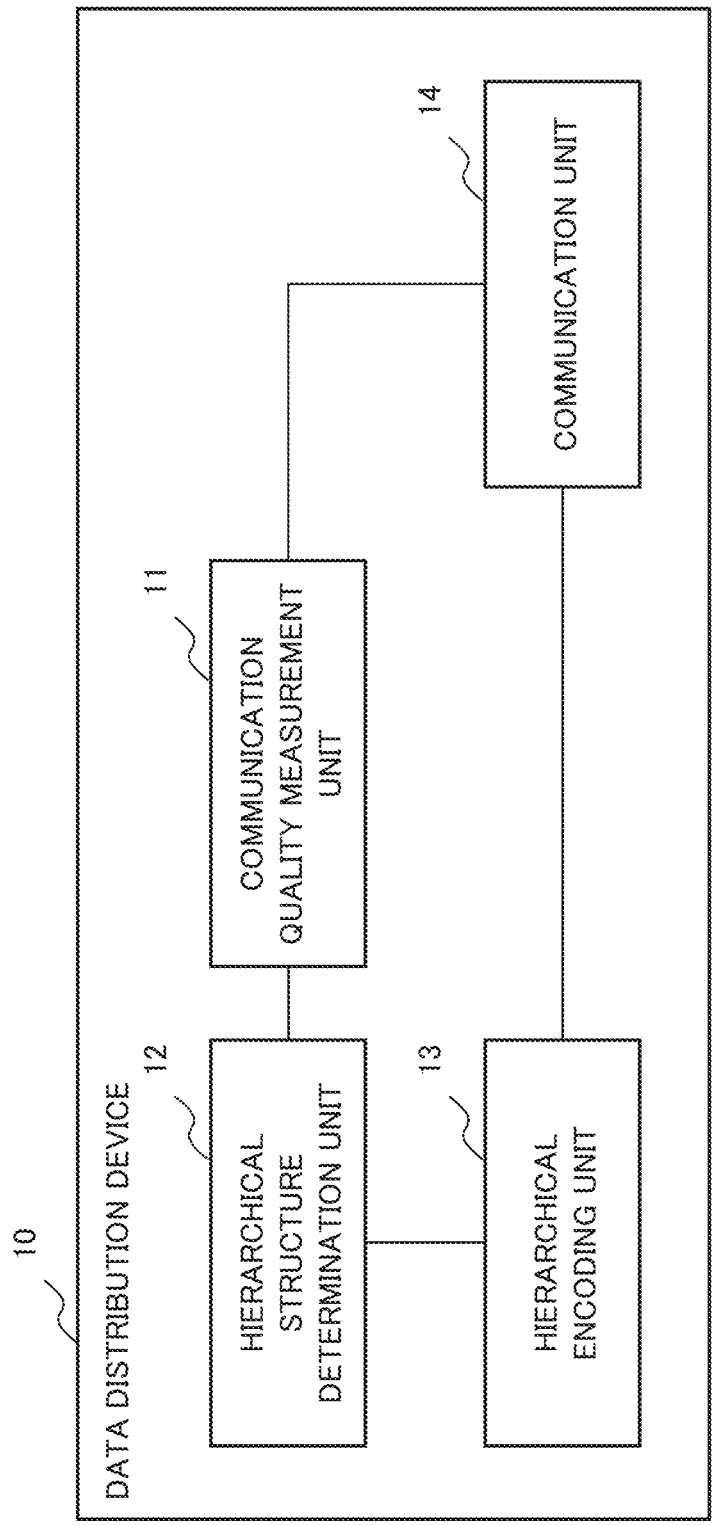
FIG. 1 is a diagram illustrating a configuration example of a data distribution device of a first example embodiment of the present invention.

A configuration example of a data distribution device 10 of the present example embodiment is illustrated in FIG. 1. The data distribution device 10 of the present example embodiment is composed of a communication quality measurement unit 11, a hierarchical structure determination unit 12, a hierarchical encoding unit 13, and a communication unit 14.

The communication quality measurement unit 11 is a portion that measures communication quality of a transmission path to a data receiving device. The hierarchical structure determination unit 12 is a portion that determines a hierarchical structure of hierarchical data on the basis of a measurement result of the communication quality. The hierarchical encoding unit 13 is a portion that generates hierarchical data having the above-described hierarchical structure by hierarchically encoding input data. The communication unit 14 is a portion that distributes distribution data in at least a part of layers of the hierarchical data to the data receiving device.

The data distribution device 10 is configured as described above, whereby the data distribution device 10 generates hierarchical data having a hierarchical structure determined on the basis of the measurement result of the communication quality of the transmission path. Thus, the hierarchical data having a hierarchical structure in response to the communication quality are generated, and accordingly, a possibility that the data suitable for the distribution will be included in the hierarchical data increases even when the number of layers is small. For this reason, even when the number of hierarchically encoded layers is small, it becomes possible to increase the possibility that the distribution can be continued even when the communication quality is degraded, and further, to increase the utilization efficiency of the capability of the transmission path.

Next, an example of an operation of the data distribution device 10 of the present example embodiment is illustrated in FIG. 2.

First, the communication quality measurement unit 11 measures the communication quality of the transmission path to the data receiving device (Step S101). Next, the hierarchical structure determination unit 12 determines the hierarchical structure of the hierarchical data on the basis of the measurement result of the communication quality (Step S102). Next, the hierarchical encoding unit 13 generates the hierarchical data having the above-described hierarchical structure by hierarchically encoding the input data (Step S103). Then, the communication unit 14 distributes the distribution data in at least a part of the layers of the hierarchical data to the data receiving device (Step S104).

By operating as described above, the data distribution device 10 generates the hierarchical data having the hierarchical structure determined on the basis of the measurement result of the communication quality of the transmission path. For this reason, even when the number of hierarchically encoded layers is small, it becomes possible to increase the possibility that the distribution can be continued even when the communication quality is degraded, and further, to increase the utilization efficiency of the capability of the transmission path.

As described above, in the first example embodiment of the present invention, the data distribution device 10 generates the hierarchical data having the hierarchical structure determined on the basis of the measurement result of the communication quality of the transmission path. Thus, the hierarchical data having the hierarchical structure in response to the communication quality are generated, and accordingly, the possibility that the data suitable for the distribution will be included in the hierarchical data increases even when the number of layers is small. For this reason, even when the number of hierarchically encoded layers is small, it becomes possible to increase the possibility that the distribution can be continued even when the communication quality is degraded, and further, to increase the utilization efficiency of the capability of the transmission path.

Second Example Embodiment

Next, a second example embodiment of the present invention will be described. In the present example embodiment, a data distribution device 20 will be described as a specific example of the data distribution device 10.

First, a configuration example of a data distribution system of the present example embodiment is illustrated in FIG. 3. The data distribution system of the present example embodiment is composed of the data distribution device 20 and a data receiving device 40. The data distribution device 20 and the data receiving device 40 are connected to each other through a network 50. In the data distribution system of the present example embodiment, one or more data receiving devices 40 are connectable to the single data distribution device 20.

Figure 4:
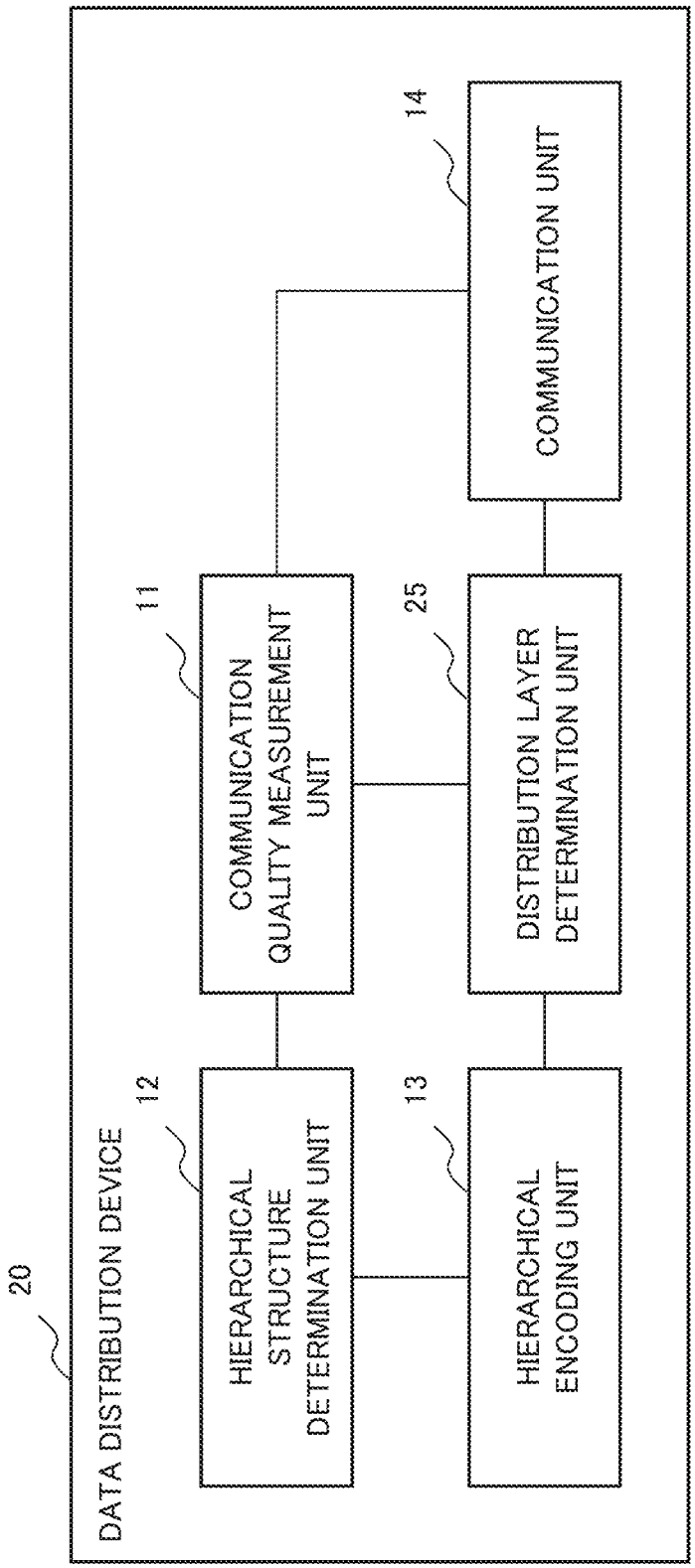
FIG. 4 is a diagram illustrating a configuration example of a data distribution device of the second example embodiment of the present invention.

Next, a configuration example of the data distribution device 20 of the present example embodiment is illustrated in FIG. 4. The data distribution device 20 is composed of a communication quality measurement unit 11, a hierarchical structure determination unit 12, a hierarchical encoding unit 13, a communication unit 14, and a distribution layer determination unit 25.

The communication quality measurement unit 11 is a portion that measures communication quality of a transmission path between the data distribution device 20 and the data receiving device 40.

The hierarchical structure determination unit 12 is a portion that determines a hierarchical structure of hierarchical data on the basis of a measurement result of the communication quality. The hierarchical structure includes, for example, bit rates of respective layers, and the like. A determination method of the hierarchical structure will be described later.

The hierarchical encoding unit 13 is a portion that generates hierarchical data having the hierarchical structure, which is determined by the hierarchical structure determination unit 12, by hierarchically encoding input data. Moreover, the hierarchical encoding unit 13 of the present example embodiment receives input data, for example, from an input device. The input device is, for example, a camera, a microphone, a sensor, and the like. Details of the hierarchical encoding will be described later.

The distribution layer determination unit 25 is a portion that determines a layer, which is to be distributed to the data receiving device 40, from among the respective layers of the hierarchical data on the basis of the measurement result of the communication quality.

The communication unit 14 is a portion that distributes distribution data in at least a part of layers of the hierarchical data to the data receiving device 40. The communication unit 14 of the present example embodiment distributes, as distribution data, hierarchical data of the layer determined by the distribution layer determination unit 25. Moreover, the communication unit 14 receives feedback information from the data receiving device 40.

Figure 5:
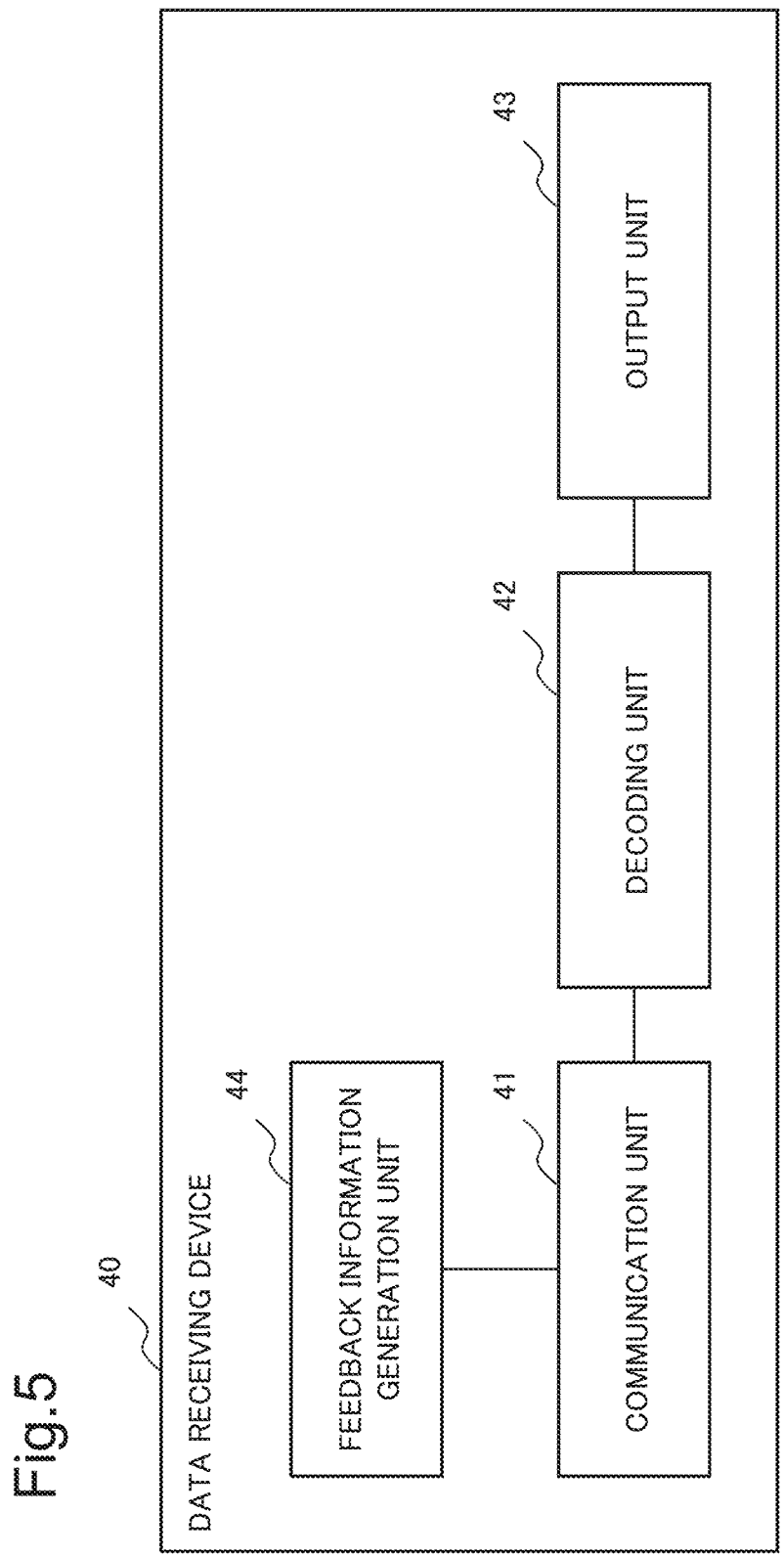
FIG. 5 is a diagram illustrating a configuration example of a data receiving device of the second example embodiment of the present invention.

Next, a configuration example of the data receiving device 40 of the present example embodiment is illustrated in FIG. 5. The data receiving device 40 of the present example embodiment is composed of a communication unit 41, a decoding unit 42, an output unit 43, and a feedback information generation unit 44.

The communication unit 41 is a portion that transmits feedback information to the data distribution device 20 as well as receives the distribution data from the data distribution device 20.

The decoding unit 42 is a portion that decodes the distribution data received by the communication unit 41.

The output unit 43 is a portion that outputs the distribution data, which is decoded by the decoding unit 42, to an output device. The output device is, for example, a display, a speaker, a storage device, or the like.

The feedback information generation unit 44 is a portion that generates feedback information regarding the communication quality of the transmission path to the data distribution device 20.

Next, the hierarchical encoding performed by the hierarchical encoding unit 13 of the data distribution device 20 will be described.

The hierarchical encoding unit 13 generates the hierarchical data having the hierarchical structure determined by the hierarchical structure determination unit 12.

It is assumed that the data distribution device 20 generates hierarchical data $L(1), L(2) \ldots, L(n)$ in which the number of layers is n. At this time, the data receiving device 40 can decode the distribution data when the data receiving device 40 can receive distribution data $(L(1), L(2) \ldots, L(i))$ of a lower i layer for arbitrary i ($1 \leq i \leq n$). As i is smaller, quality of decoded media decreases though a data quantity of the distribution data is reduced. Meanwhile, as i is larger, the data quantity of the distribution data increases though the quality of the decoded media is improved.

The hierarchical structure determined by the hierarchical structure determination unit 12 includes the bit rates of the respective layers. Moreover, the hierarchical structure may include a frame rate when a piece of the input data is a video, a sampling frequency when a piece of the input data is a voice, a transmission cycle when a piece of the input data is a piece of sensor data, and the like.

When a piece of the input data is a video, the hierarchical encoding unit 13 may use a hierarchical encoding method such as H.264 scalable video coding (SVC) and high efficiency video coding (HEVC) scalable extension (SHVC).

Moreover, the hierarchical encoding unit 13 may perform the hierarchical encoding on the basis of a reference relationship between the respective frames in encoding that uses H.264 advanced video coding (AVC) or HEVC, which is incompatible with the hierarchical encoding. For example, in a case of hierarchical B pictures in which respective frames are encoded hierarchically while referring to frames before and after the same, a frame to be referred to is placed to a lower layer, and a referring frame is placed to an upper layer, whereby it is possible to perform the hierarchical encoding even without using a hierarchical encoding standard such as H.264 SVC and SHVC.

Moreover, the hierarchical encoding unit 13 may use a hierarchical encoding method in joint photographic experts group (JPEG) or motion JPEG.

When a piece of the input data is a voice, the hierarchical encoding unit 13 may perform hierarchical encoding depending on whether there is such a function as perceptual noise substitution (PNS), spectral band replication (SBR), and parametric stereo (PS) in advanced audio coding (AAC).

When a piece of the input data is a piece of sensor data, the hierarchical encoding unit 13 may perform the hierarchical encoding on the basis of a data acquisition interval. For example, the hierarchical encoding unit 13 can perform the hierarchical encoding in such a way that the data acquisition interval becomes long when the distribution layer of the distribution data is only a lower layer, and in such a way that the data acquisition interval becomes short by adding an upper layer to the distribution layer.

Next, a determination method of the distribution layer, which is performed by the distribution layer determination unit 25, will be described.

Figure 6:
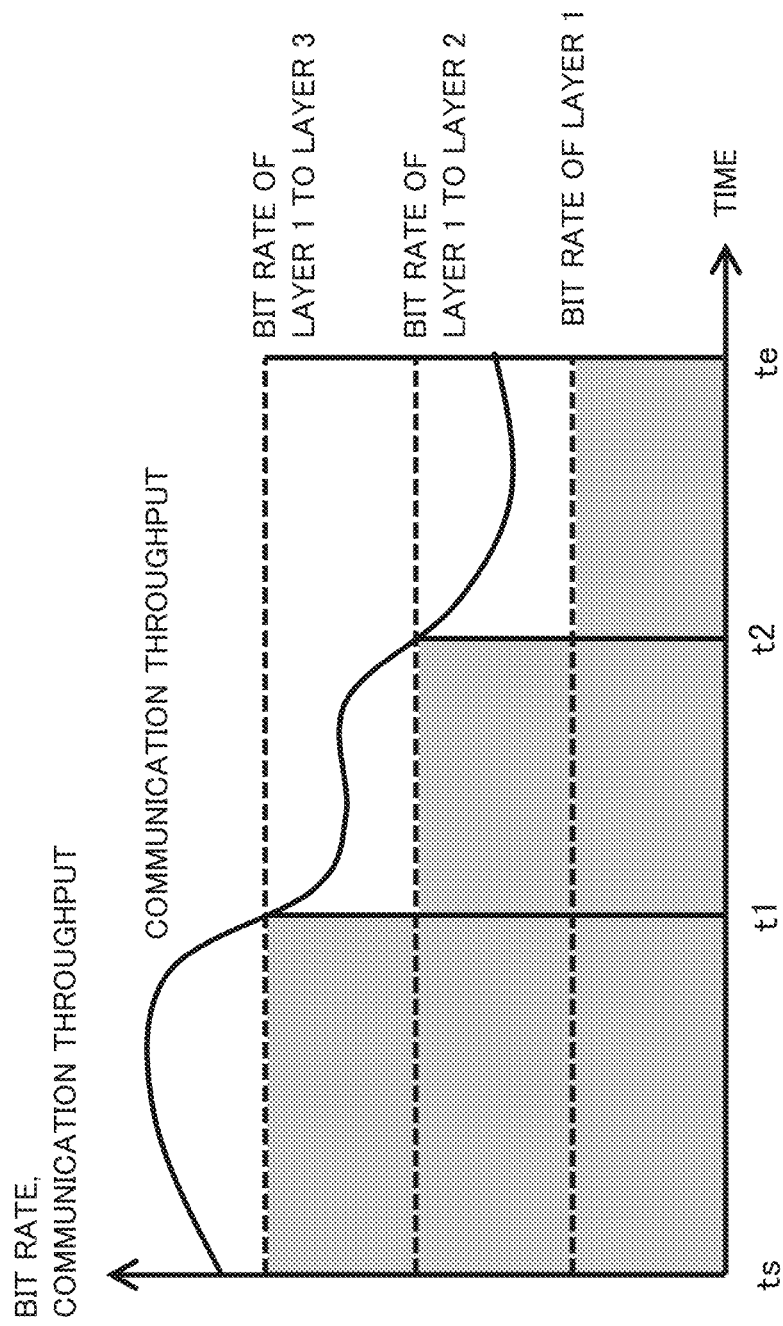
FIG. 6 is a diagram illustrating an example of a communication throughput and distribution layers in the second example embodiment of the present invention.

In FIG. 6, examples of the communication throughput and the distribution layers in the present example embodiment are illustrated.

A horizontal axis in FIG. 6 is a time. ts is a distribution starting time in a certain hierarchical structure. to is a distribution ending time (a distribution starting time in a next hierarchical structure). A vertical axis is the bit rate of the hierarchical data, and the communication throughput between the data distribution device 20 and the data receiving device 40. Broken lines represent bit rates of hierarchical data when the respective layers are selected. Moreover, a curve in FIG. 6 represents the communication throughput, and the communication throughput changes with time. Note that, in this example, the number of layers of the hierarchical data is assumed to be three.

At time ts, the communication throughput is higher than a bit rate of hierarchical data including a layer 1 to a layer 3. For this reason, the distribution layer determination unit 25 determines three layers from the layer 1 to the layer 3 as distribution layers.

At time t1, when the communication throughput falls below a bit rate when the layer 1 to the layer 3 are distributed, the distribution layer determination unit 25 stops the distribution of the layer 3, and sets two layers which are the layer 1 and the layer 2 as the distribution layers. At time t2, when the communication throughput falls below a bit rate when the layer 1 and the layer 2 are distributed, the distribution layer determination unit 25 stops the distribution of the layer 2, and sets only the layer 1 as the distribution layer.

As described above, in the distribution layer determination unit 25, hierarchical data up to a highest layer within a range where the bit rate of the distribution data does not exceed the communication throughput. In the example of FIG. 6, the distribution layer determination unit 25 switches the distribution layer by using, as a trigger, the fact that the communication throughput falls below the bit rate of the distribution data. However, a switching method is not limited to this method. For example, the distribution layer determination unit 25 may switch the distribution layer when the communication throughput falls below x times the bit rate of the distribution data (where x is a real number of 1 or more).

Next, a measurement method of the communication quality by the communication quality measurement unit 11 of the data distribution device 20 will be described.

The communication quality measurement unit 11 measures the communication quality of the transmission path between the data distribution device 20 and the data receiving device 40. The communication quality is, for example, a communication throughput.

For example, when a piece of the input data is a video, the data distribution device 20 transmits data, which constitute one video frame, to the data receiving device 40 at a time, and the data receiving device 40 measures a size of the video frame and a time required to receive the data. The time required to receive the data is, for example, a time since the data receiving device 40 receives a piece of head data of the data which constitutes the video frame until the data receiving device 40 receives a piece of final data of the data which constitutes the video frame. Then, the communication throughput is calculated by dividing the size of the video frame by the time required to receive the video frame.

As a calculation method of the communication throughput, for example, conceivable is a method of calculating the communication throughput by the feedback information generation unit 44 of the data receiving device 40 and giving feedback of the calculated communication throughput to the communication quality measurement unit 11 of the data distribution device 20. Alternatively, also conceivable is a method, in which the data receiving device 40 gives the data distribution device 20 feedback of the size of each frame and the time required to receive the data, and in which the communication quality measurement unit 11 of the data distribution device 20 calculates the communication throughput. Alternatively, also conceivable is a method, in which the data receiving device 40 transmits acknowledgement (ACK) of each packet, which constitutes the video frame, to the data distribution device 20, and the communication quality measurement unit 11 of the data distribution device 20 calculates the size, the time, and the communication throughput.

Likewise, also when a piece of the input data is other than the video, data composed of a plurality of packets are collectively transmitted by the data distribution device 20, and a size of the data thus transmitted is divided by a time required to receive the data, whereby the communication throughput can be calculated. Moreover, the data distribution device 20 may transmit a packet sequence for measuring the communication throughput separately from the distribution data.

Next, a determination method of the hierarchical structure by the hierarchical structure determination unit 12 of the data distribution device 20 will be described.

Figure 7:
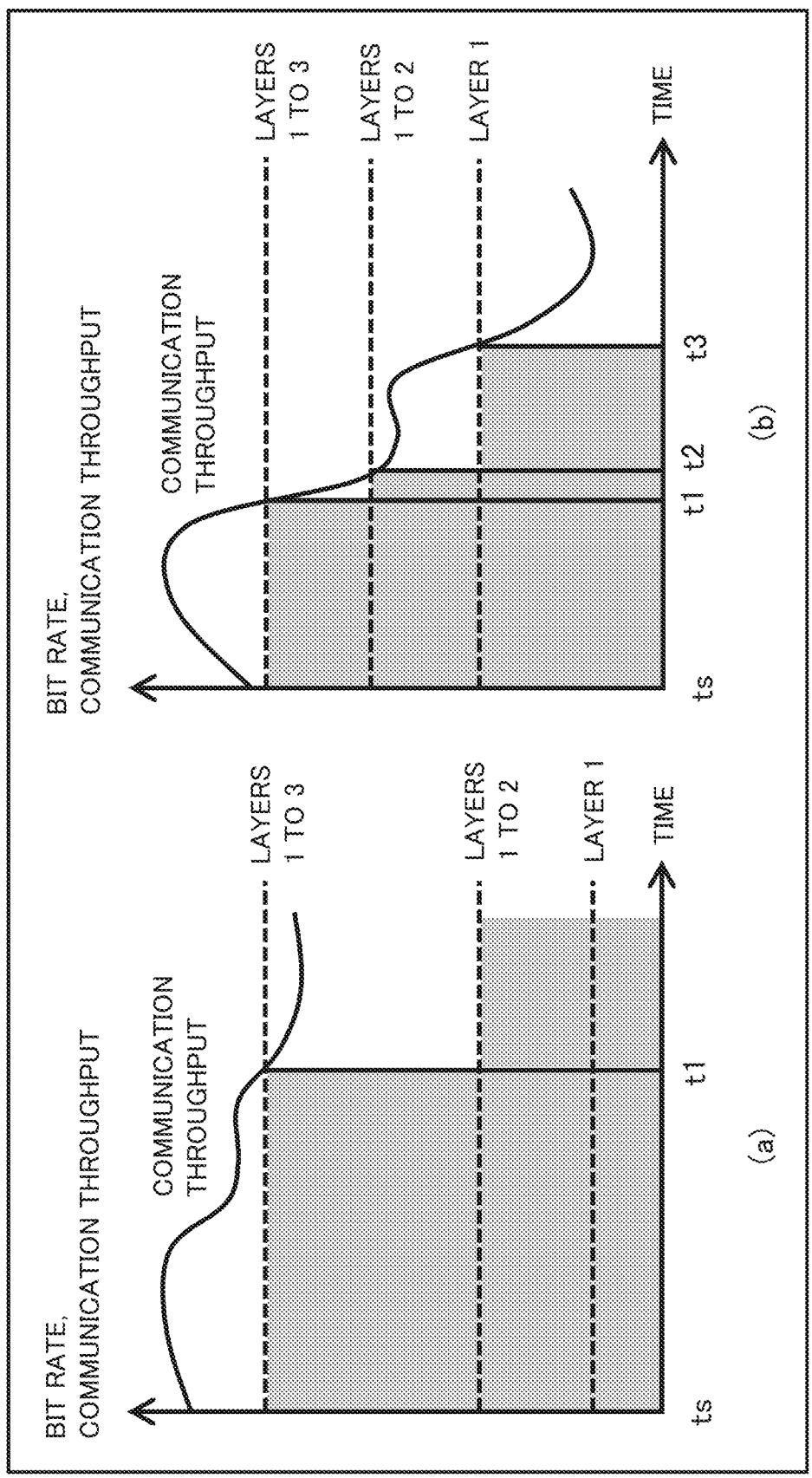
FIG. 7 is diagrams illustrating examples of the communication throughput and the distribution layers when a hierarchical structure is not appropriate.

In FIG. 7, examples of the communication throughput and the distribution layers are illustrated.

In (a) of FIG. 7, at time t1, the communication throughput falls below a bit rate of the distribution data when the layer 1 to the layer 3 are distributed, and accordingly, the distribution layer determination unit 25 stops the distribution of the layer 3. Then, though the communication throughput falls just a little below the bit rate of the distribution data when the layer 1 to the layer 3 are distributed, the bit rate of the distribution data decreases largely by the fact that the distribution of the layer 3 is stopped. As a result, a difference between the communication throughput and the bit rate of the distribution data becomes large. This means that the capability of the transmission path between the data distribution device 20 and the data receiving device 40 cannot be utilized effectively.

In (b) of FIG. 7, the distribution layer determination unit 25 stops the distribution of the layer 3 at time t1, and stops the distribution of the layer 2 at time t2. Then, at time t3, the communication throughput falls below the bit rate of the distribution data when only the layer 1 is distributed. Even when the data distribution device 20 distributes only the layer 1 in this state, the data receiving device 40 cannot receive normal distribution data since a delay increase and a packet loss occur.

As described above, in FIG. 7, there occur such a problem that the capability of the transmission path cannot be utilized effectively and such a problem that the distribution data cannot be distributed normally, and accordingly, a relationship between the communication throughput and the hierarchical structure is not appropriate.

Figure 8:
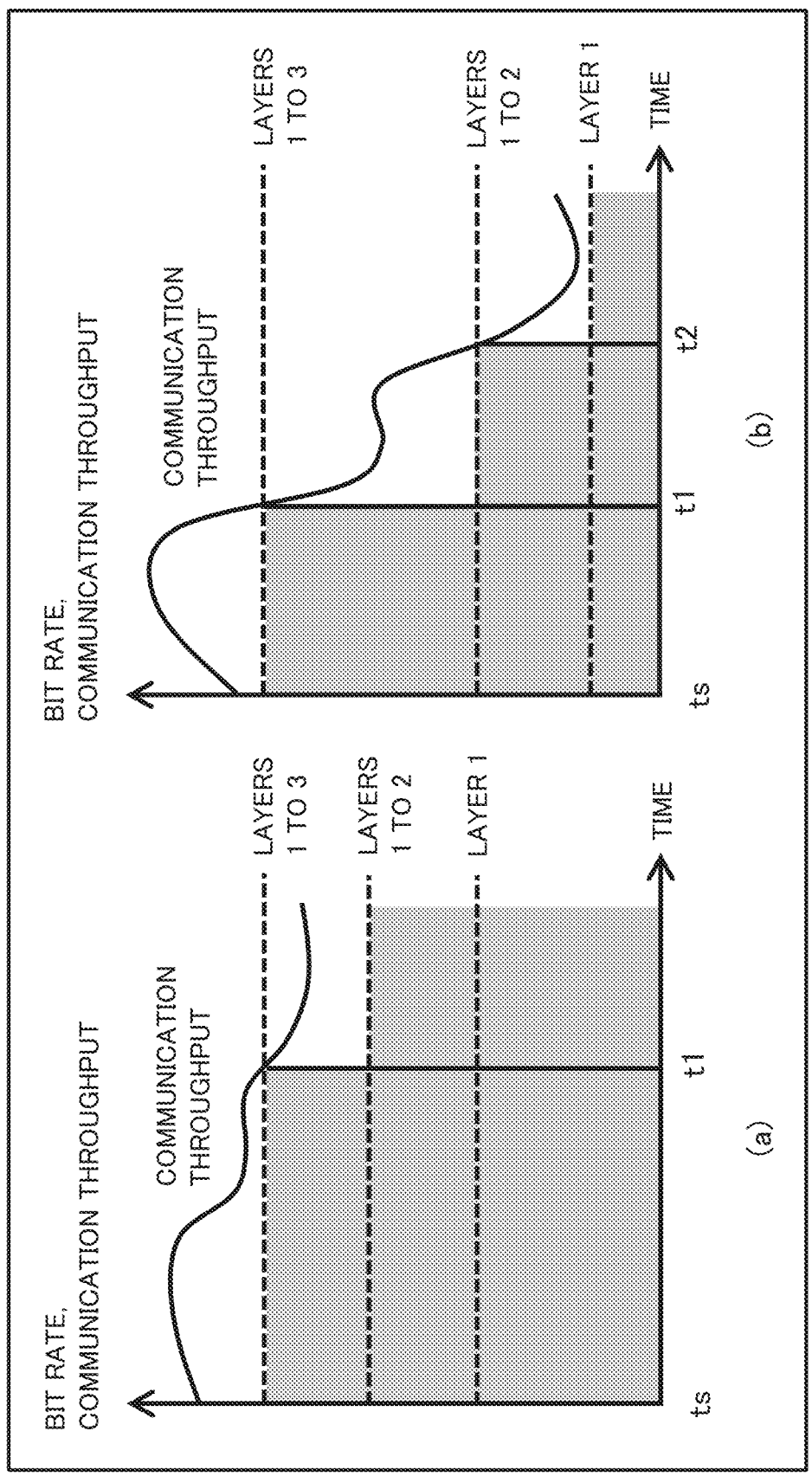
FIG. 8 is diagrams illustrating examples of the communication throughput and the distribution layers when the hierarchical structure is appropriate.

(a) and (b) of FIG. 8 are examples of a communication throughput and distribution layers when the hierarchical structures in (a) and (b) of FIG. 7 are reversed. By reversing the hierarchical structures, the above two problems can be solved. One of the problems occurs in (a) of FIG. 7 and is that the capability of the transmission path cannot be utilized effectively. Another problem occurs in (b) of FIG. 7 and is that the distribution of the distribution data cannot be performed normally. As described above, in order to achieve high-quality data distribution, it is important that the hierarchical structure is appropriate.

Accordingly, the hierarchical structure determination unit 12 of the present example embodiment determines the hierarchical structure on the basis of a variation amount of a past measurement result of the communication quality measured by the communication quality measurement unit 11.

For example, when the variation amount of the communication throughput is small, then as in FIG. 8(a), the hierarchical structure determination unit 12 sets the bit rate of each layer more densely than when the variation amount is large. Thus, the bit rate of the distribution data is prevented from decreasing largely when the communication throughput decreases a little, and accordingly, it becomes possible to use the capability of the transmission path more effectively.

Moreover, when the variation amount of the communication throughput is large, then as in FIG. 8(b), the hierarchical structure determination unit 12 sets the bit rate of each layer more roughly than when the variation amount is small. Thus, it becomes possible to continue the distribution even when the communication throughput decreases largely.

Note that the hierarchical structure determination unit 12 may determine the hierarchical structure on the basis of a variation amount of a predicted value of future communication quality predicted from the measurement results of the communication quality. For example, in FIG. 7 of PTL 2, a technique for predicting a future probability distribution of communication throughputs is described. On the basis of the predicted future probability distribution, the hierarchical structure determination unit 12 can determine the bit rate of each layer similarly to the case of using the past communication quality. By using the future predicted value, the bit rate can be set more appropriately than in the case of using the past history.

Next, a specific example of the determination method of the hierarchical structure by the hierarchical structure determination unit 12 will be described.

In FIG. 9, an example of communication throughputs per second, which are measured by the communication quality measurement unit 11, is illustrated. Each throughput Th(t) of a time t[s] in FIG. 9 is a communication throughput in a time [t−1, t).

In the present example embodiment, the hierarchical structure determination unit 12 determines the hierarchical structure on the basis of a communication throughput Th(t−1) immediately before and a standard deviation of communication throughputs during past ten seconds.

In FIG. 10, examples of average values $\mu$ and standard deviations $\sigma$ during past ten seconds, which are calculated from the communication throughputs of FIG. 9 at time t=11 and after, are illustrated. The hierarchical structure determination unit 12 determines the bit rate of each layer by using the standard deviation, and can thereby determine the hierarchical structure in response to a magnitude of variations of the communication throughputs.

When the number of layers is three, for example, the hierarchical structure determination unit 12 determines, at time t, a bit rate r1(t) when only the layer 1 is distributed as Th(t−1)−2$\sigma$ obtained by subtracting a double of the standard deviation from the communication throughput immediately before. Moreover, the hierarchical structure determination unit 12 determines a bit rate r2(t) when the layer 1 and the layer 2 are distributed as Th(t−1)−$\sigma$ obtained by subtracting the standard deviation from the communication throughput immediately before. Moreover, the hierarchical structure determination unit 12 determines a bit rate r3(t) when the layer 1 to the layer 3 are distributed as Th(t−1) that is the communication throughput immediately before.

FIG. 11 is bit rates of the respective layers, which are calculated by this method. For example, when the case where the time t is 11 is taken as an example, in FIG. 9, a communication throughput at time t−1=10 (FIG. 9) is 2.31 Mbps. Moreover, in FIG. 10, a standard deviation at time t=11 is 0.38 Mbps. For this reason, those are established, which are r1(11)=2.31−2×0.38=1.55 Mbps, r2(11)=2.31−0.38=1.93 Mbps, and r3(11)=2.31 Mbps.

Referring to FIG. 11, at time t=11 and time t=26, the communication throughput immediately before coincides with each other as 2.31 Mbps, and accordingly, r3 at time t=11 and t=26 is the same value. Meanwhile, with regard to r1 and r2, the communication throughput is higher at time t=11 when the standard deviation (FIG. 10) is smaller. That is, the width of the bit rate of the distribution data in each distribution layer is narrower at time t=11 when the standard deviation is smaller.

As described above, the bit rate of each layer is set on the basis of the probability distribution, whereby an interval of the bit rates of the respective layers is narrowed in an environment where the variation amount of the communication throughput is small, and interval of the bit rates is widened in an environment where the variation amount is large. For this reason, it becomes possible to appropriately set the bit rates of the respective layers as in FIG. 8.

Note that values different from those described above may be set for a coefficient of the standard deviation $\sigma$. For example, r1(t) may be set equal to Th(t−1)−3$\sigma$, and r2(t) may be set equal to Th(t−1)−1.5$\sigma$. By increasing the coefficient of the standard deviation $\sigma$, the possibility that r1 will exceed the communication throughput and the distribution cannot be continued can be reduced.

A history of a predetermined number of communication throughputs is not present for a certain period of time (10 seconds in the above-described example) from the start of the distribution. Accordingly, values obtained by reducing the communication throughput immediately before by a predetermined ratio or amount may be set as bit rates when the layer 1, or the layer 1 and the layer 2 are distributed. When a value that assumes an environment where the communication throughput varies largely is set in advance as an initial value of such a reduction amount, the distribution can be continued even when the communication throughput decreases largely.

Moreover, when a larger number of layers can be set as the number of layers, a lower value can be set for r1, or alternatively, the interval of the bit rate of each layer can be narrowed. Accordingly, when the communication throughput decreases, the continuation of the distribution and the effective utilization of the capability of the transmission path are facilitated. For example, by using four layers, r1($t$) can be set equal to Th(t−1)−3σ, r2($t$) can be set equal to Th(t−1)−2σ, r3($t$) can be set equal to Th(t−1)−σ, and r4($t$) can be set equal to Th(t−1).

Moreover, a value obtained by statistically processing the communication throughput Th may be used in place of Th(t−1).

Specifically, an average value Thm(t−1) for past a seconds (a is a natural number) may be obtained by Equation (1), and this average value Thm(t−1) may be used in place of Th(t−1).

$$Thm(t-1) = (\Sigma_{t-1-\alpha}^{t-1} Th(f))/\alpha \quad (1)$$

Moreover, with respect to a coefficient α that is 0 or more and 1 or less, an exponentially smoothed throughput Ths(t−1) may be obtained by Equation (2), and this exponentially smoothed throughput Ths(t−1) may be used in place of Th(t−1).

$$Ths(t-1) = \alpha Ths(t-2) + (1-\alpha) Th(t-1) \quad (2)$$

Next, a specific example of the determination method of the distribution layer by the distribution layer determination unit 25 in the above-described example will be described.

In the example of FIG. 11, at time t=11, the hierarchical structure determination unit 12 sets 1.55 Mbps for the bit rate r1, 1.93 Mbps for the bit rate r2, and 2.31 Mbps for the bit rate r3. During a time [11, 12), the distribution layer determination unit 25 determines the distribution layer from among these three types of bit rates.

For example, it is assumed that, at time t=11, the distribution layer determination unit 25 determines all the layers as the distribution layers, and the communication unit 14 distributes distribution data of 2.31 Mbps. Then, when the communication throughput decreases to less than 2.31 Mbps, the distribution layer determination unit 25 stops the distribution of the layer 3, and determines the layer 1 and the layer 2 as the distribution layers, and the communication unit distributes distribution data of 1.93 Mbps. Moreover, when the communication throughput decreases to less than 1.93 Mbps, the distribution layer determination unit 25 stops the distribution of the layer 2, and determines the layer 1 as the distribution layer, and the communication unit 14 distributes distribution data of 1.55 Mbps. On the contrary, when the communication throughput becomes equal to or more than a bit rate of distribution data higher by one step, the distribution layer determination unit 25 increases the distribution layer to the layer higher by one step.

The data distribution device 20 is configured as described above, whereby the data distribution device 20 generates hierarchical data having a hierarchical structure determined on the basis of the measurement result of the communication quality of the transmission path. Thus, the hierarchical data having the hierarchical structure in response to the communication quality are generated, and accordingly, the possibility that the data suitable for the distribution will be included in the hierarchical data increases even when the number of layers is small. For this reason, even when the number of hierarchically encoded layers is small, it becomes possible to increase the possibility that the distribution can be continued even when the communication quality is degraded, and further, to increase the utilization efficiency of the capability of the transmission path.

Next, an operation example of the data distribution system of the present example embodiment will be described with reference to FIGS. 12 and 13.

Figure 12:
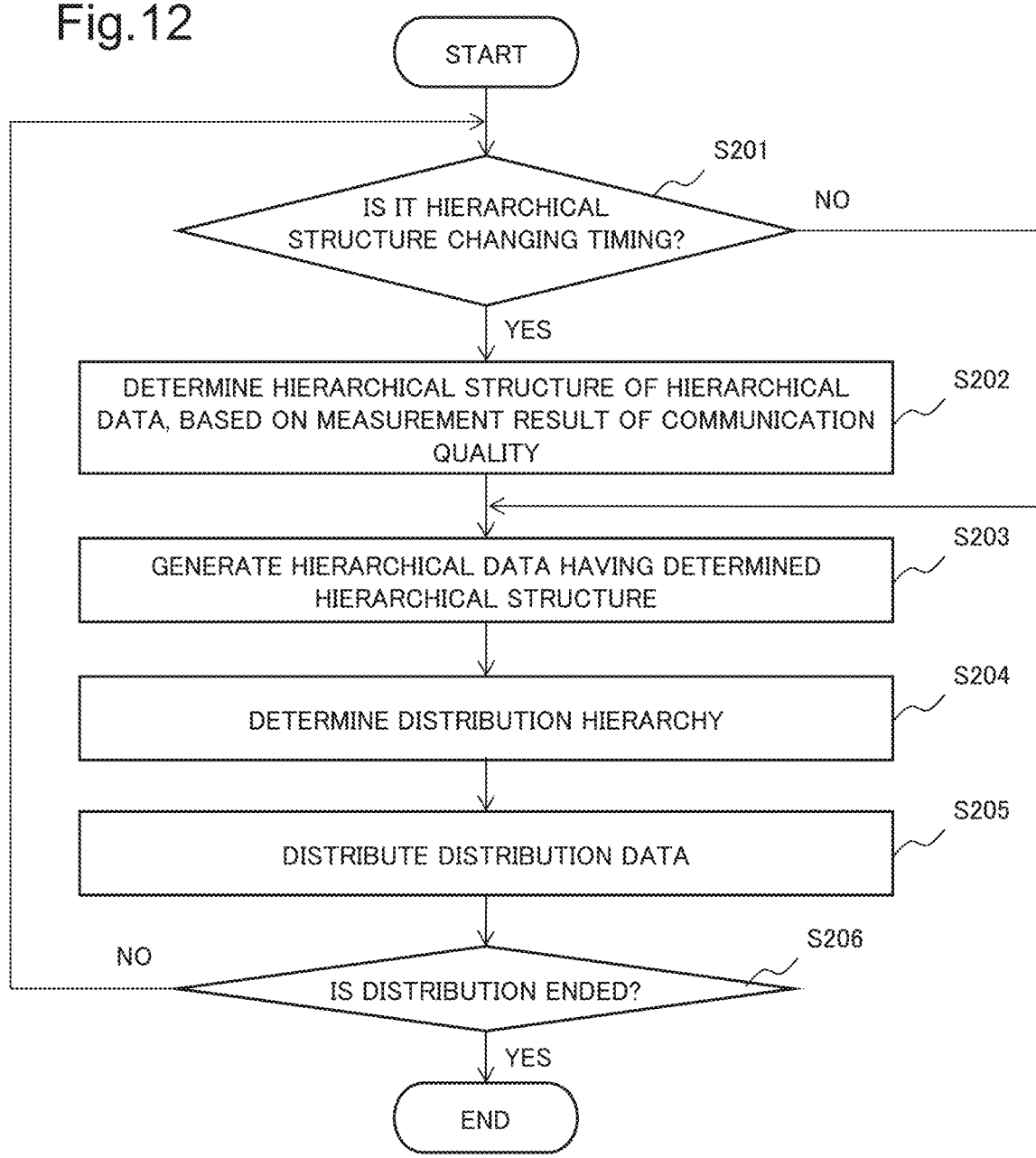
FIG. 12 is a diagram illustrating an operation example of the data distribution system of the second example embodiment of the present invention.

First, an operation example of the data distribution device 20 of the present example embodiment is illustrated in FIG. 12.

Note that the communication quality measurement unit 11 is assumed to measure the communication quality (or predict future communication quality) at arbitrary timing on the basis of the feedback information received by the communication unit 14 from the data receiving device 40.

First, the hierarchical structure determination unit 12 determines whether or not it is timing to change the hierarchical structure (Step S201). The timing to change the hierarchical structure is on a predetermined cycle from one second to several seconds, and in addition, is predetermined timing such as timing when a network state suddenly varies. When a piece of the input data is a video, timing when an aggregate of video frames, which is called group of picture (GOP), is switched may be set as such hierarchical structure changing timing.

When it is the hierarchical structure changing timing (YES in Step S201), the hierarchical structure determination unit 12 determines the hierarchical structure of the hierarchical data on the basis of the measurement result of the communication quality (Step S202).

Next, the hierarchical encoding unit 13 generates the hierarchical data having the hierarchical structure, which is determined by the hierarchical structure determination unit 12, by hierarchically encoding the input data (Step S203).

Next, the distribution layer determination unit 25 determines the layer, which is to be distributed to the data receiving device 40, from among the respective layers of the hierarchical data (Step S204). Then, from among the hierarchical data, the communication unit 14 distributes the distribution data of the layer determined by the distribution layer determination unit 25 (Step S205). The data distribution device 20 repeats operations from Step S201 to Step S205 until the data distribution operation of the data distribution device 20 ends (Step S206).

Figure 13:
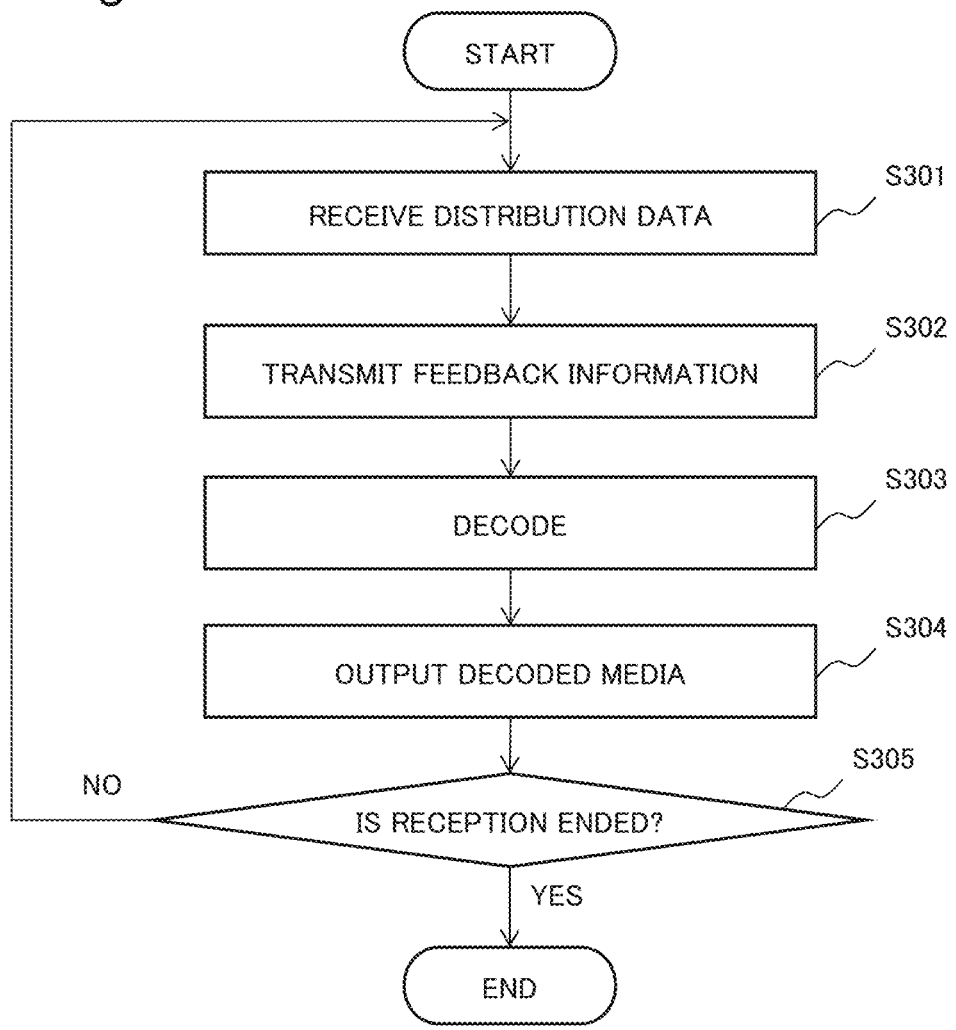
FIG. 13 is a diagram illustrating an operation example of the data distribution system of the second example embodiment of the present invention.

Next, an operation example of the data receiving device 40 of the present example embodiment is illustrated in FIG. 13.

First, when the communication unit 41 receives the distribution data (Step S301), the feedback information generation unit 44 generates the feedback information regarding the communication quality of the transmission path. Then, the communication unit 41 transmits the feedback information to the data distribution device 20 (Step S302).

Next, the decoding unit 42 decodes the distribution data (Step S303). Then, the output unit 43 outputs decoded media (Step S304). The data receiving device 40 repeats operations from Step S301 to Step S304 during a period while receiving the distribution data (Step S305).

Figure 14:
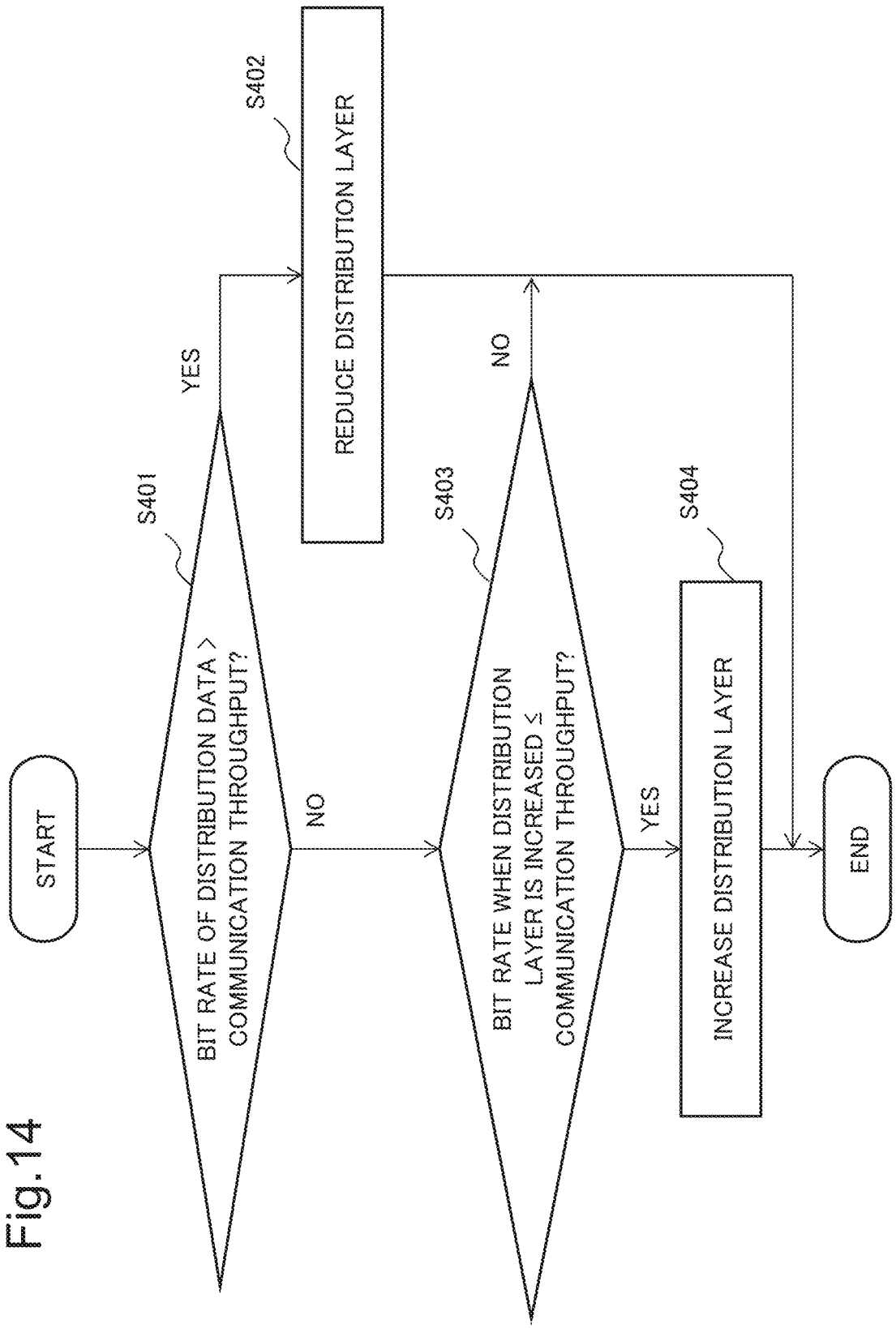
FIG. 14 is a diagram illustrating an operation example of the data distribution system of the second example embodiment of the present invention.

Next, an operation example of the distribution layer determination unit 25 of the data distribution device 20 of the present example embodiment is illustrated in FIG. 14. This is a more detailed example of Step S204 of FIG. 12.

When the bit rate of the distribution data under distribution becomes larger than the communication throughput (YES in Step S401), the distribution layer determination unit 25 reduces the distribution layer (Step S402). At this time, the distribution layer determination unit 25 reduces, for example, the distribution layer by one step, or reduces the distribution layer until the bit rate of the distribution data becomes the communication throughput or less.

Moreover, when the bit rate when the distribution layer is increased is the communication throughput or less (YES in Step S403), the distribution layer determination unit 25 increases the distribution layer (Step S404). At this time, the distribution layer determination unit 25 increases the distribution layer by one step, or increases the distribution layer within a range where the bit rate of the distribution data becomes the communication throughput or less.

By operating as described above, the data distribution device 20 generates the hierarchical data having the hierarchical structure determined on the basis of the measurement result of the communication quality of the transmission path. For this reason, even when the number of hierarchically encoded layers is small, it becomes possible to increase the possibility that the distribution can be continued even when the communication quality is degraded, and further, to increase the utilization efficiency of the capability of the transmission path.

As described above, in the second example embodiment of the present invention, the data distribution device 20 generates the hierarchical data having the hierarchical structure determined on the basis of the measurement result of the communication quality of the transmission path. Thus, the hierarchical data having the hierarchical structure in response to the communication quality are generated, and accordingly, the possibility that the data suitable for the distribution will be included in the hierarchical data increases even when the number of layers is small. For this reason, even when the number of hierarchically encoded layers is small, it becomes possible to increase the possibility that the distribution can be continued even when the communication quality is degraded, and further, to increase the utilization efficiency of the capability of the transmission path.

Third Example Embodiment

Next, a third example embodiment of the present invention will be described. The present example embodiment is a specific example in a case where a piece of input data is a video.

A configuration example and operation example of the data distribution device 20 of the present example embodiment are similar to those of the second example embodiment. Herein, the hierarchical encoding performed by the hierarchical encoding unit 13 will be described more specifically. Other portions are similar to those of the second example embodiment, and accordingly, a description thereof will be omitted.

In many cases, H.264 SVC and SHVC are used for the hierarchical encoding of video data. In these hierarchical encoding methods, the video data are hierarchically encoded on three bases which are time, space, and signal noise ratio (SNR). The hierarchical encoding is performed by combining one or more of these bases.

In a case of the hierarchical encoding on the time basis, the hierarchical encoding is performed in such a way that a frame rate rises as the number of layers is larger. For example, the hierarchical encoding is performed in such a way that the frame rate becomes 6 frames per second (fps) when the layer is only a layer 1, becomes 12 fps when a layer 2 is added thereto, and becomes 24 fps when a layer 3 is added thereto.

In a case of the hierarchical encoding on the space basis, the hierarchical encoding is performed in such a way that a resolution rises as the number of layers is larger. For example, the hierarchical encoding is performed in such a way that the resolution becomes 640×360 when the layer is only the layer 1, becomes 1280×720 when the layer 2 is added thereto, and becomes 1920×1080 when the layer 3 is added thereto.

In a case of the hierarchical encoding on the SNR basis, the hierarchical encoding is performed in such a way that a video becomes a blurred video in a low layer and the video becomes a clearer video as the number of layers increases.

In FIG. 15, illustrated is an example of the resolution, the frame rate, and the bit rate in each layer when the hierarchical encoding is performed on the two bases which are the time and space. In this example, the frame rate rises by adding the layer 2 to the layer 1 (time basis), and the resolution of each frame rises by further adding the layer 3 thereto (space basis).

Figure 16:
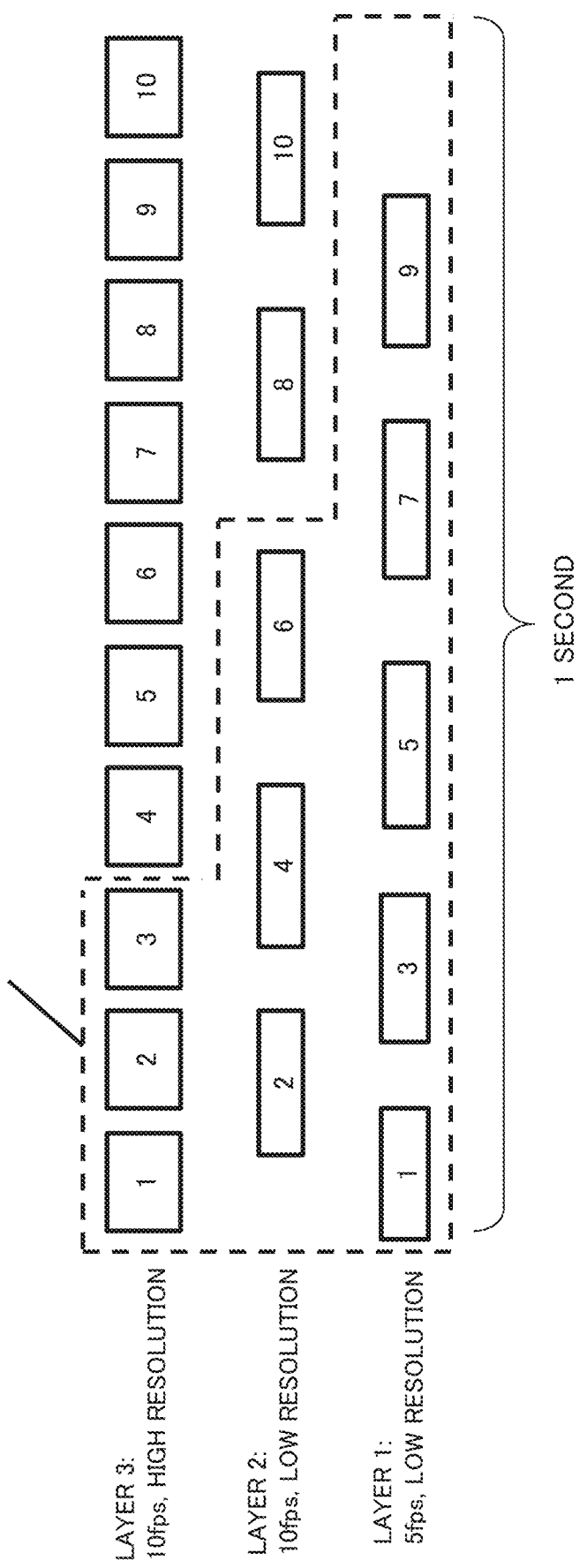
FIG. 16 is a diagram illustrating an example of distribution layers of the data distribution device of the third example embodiment of the present invention.

In FIG. 16, illustrated is an example of a video frame actually distributed when the distribution layer is switched as in FIG. 6. Each quadrangle in FIG. 16 represents distribution timing of each video frame, and a number inside the quadrangle is a frame number. Moreover, a broken line indicates the distributed layer.

In this example, the data distribution device 20 distributes the layer 1 to the layer 3 in a frame 1 to a frame 3, and accordingly, with regard to the distributed video data, a resolution thereof is 1280×720 and 640×360, and a frame rate of all thereof is 10 fps. At this time, in the data receiving device 40, the video data with a resolution as high as 1280×720 are selected and displayed. In a frame 4 to a frame 6, the resolution of the distributed video data becomes only 640×360 (where the frame rate is 10 fps). In a frame 7 and after, the frame rate of the distributed video data drops to 5 fps.

In the present example embodiment, the hierarchical structure determination unit 12 determines the hierarchical structure at predetermined timing in response to the communication quality, the hierarchical encoding unit 13 hierarchically encodes the video data on the basis of the determined hierarchical structure, and the distribution layer determination unit 25 switches the distribution layer in response to the communication quality. The hierarchical encoding unit 13 performs the hierarchical encoding in advance in response to the communication quality as described above, and accordingly, the distribution layer determination unit 25 can drop the bit rate of the distribution data instantaneously when the communication quality is degraded. For this reason, the stop of the video due to a delay increase of packets and the disturbance of the video due to a packet loss are reduced, thus making it possible to view the video with high quality.

As described above, in the third example embodiment of the present invention, the data distribution device 20 generates the hierarchical data having the hierarchical structure determined on the basis of the measurement result of the communication quality of the transmission path. Thus, the hierarchical data having the hierarchical structure in response to the communication quality are generated, and accordingly, the possibility that the data suitable for the distribution will be included in the hierarchical data increases even when the number of layers is small. For this reason, even when the number of hierarchically encoded layers is small, it becomes possible to increase the possibility that the distribution can be continued even when the communication quality is degraded, and further, to increase the utilization efficiency of the capability of the transmission path.

[Hardware Configuration Example]

A description will be made of a configuration example of a hardware resource that achieves the data distribution device (10, 20) in each of the above-described example embodiments of the present invention by using one information processing device (computer). Note that the data distribution device may be achieved by using at least two information processing devices physically or functionally. Moreover, the data distribution device may be achieved as a dedicated device. Furthermore, only a function of a part of the data distribution device may be achieved by using the information processing device.

Figure 17:
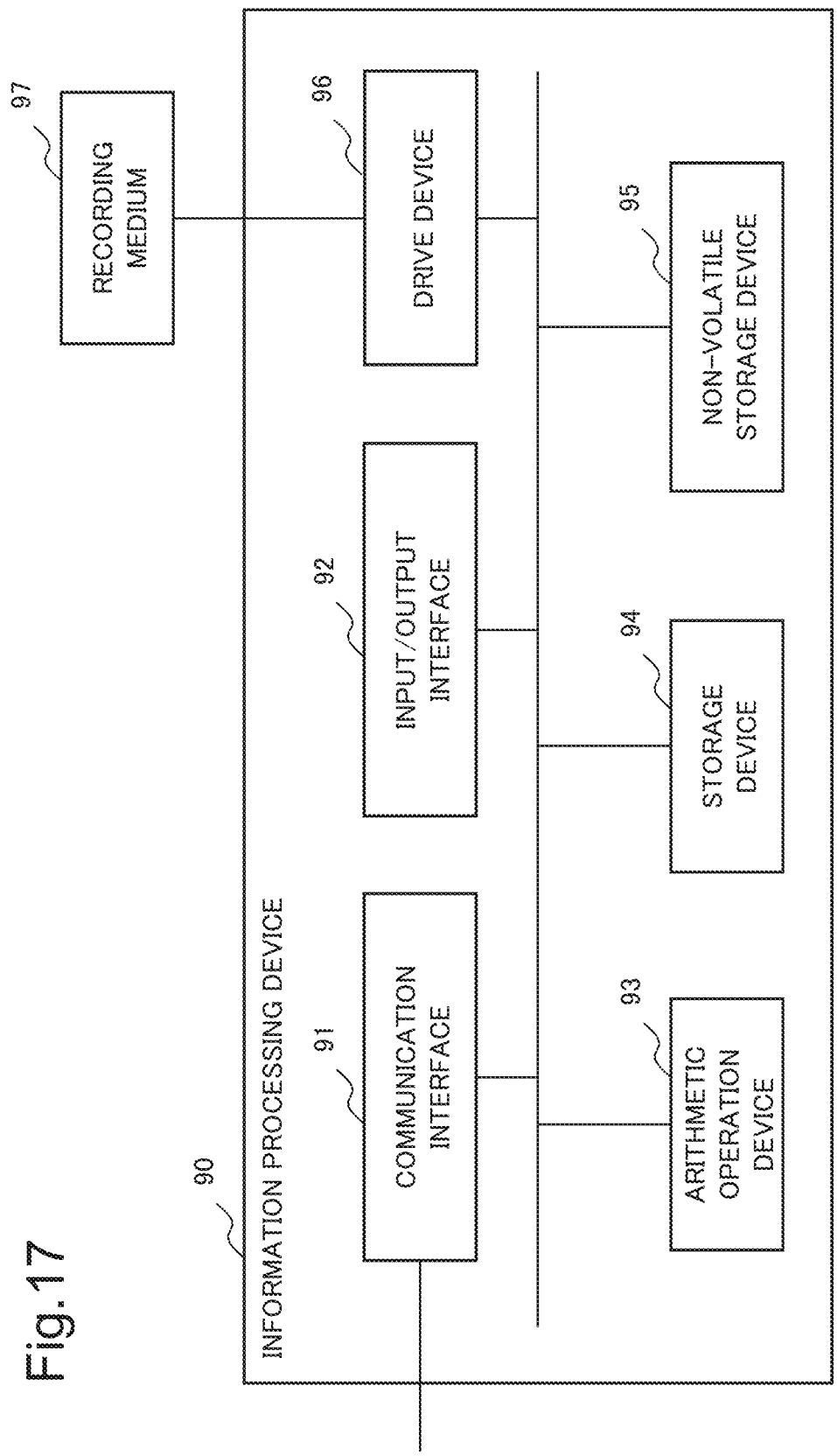
FIG. 17 is a diagram illustrating a hardware configuration example of the respective example embodiments of the present invention.

FIG. 17 is a diagram schematically illustrating a hardware configuration example of the information processing device capable of achieving the data distribution device of each of the example embodiments of the present invention. An information processing device 90 includes a communication interface 91, an input/output interface 92, an arithmetic operation device 93, a storage device 94, a non-volatile storage device 95, and a drive device 96.

The communication interface 91 is communication means for causing the data distribution device of each of the example embodiments to communicate with an external device in a wired and/or wireless manner. Note that, when the data distribution device is achieved by using at least two information processing devices, these devices may be connected to each other in such a way as to be communicable with each other through the communication interface 91.

The input/output interface 92 is a man-machine interface such as a keyboard as one example of an input device and a display as an output device.

The arithmetic operation device 93 is an arithmetic processing device such as general-purpose central processing unit (CPU) and microprocessor. The arithmetic operation device 93 is capable of reading out, for example, a variety of programs, which are stored in the non-volatile storage device 95, into the storage device 94, and of executing processing in accordance with the program thus read out.

The storage device 94 is a memory device such as a random access memory (RAM) capable of being referred to from the arithmetic operation device 93, and stores the program, a variety of data, and the like. The storage device 94 may be a volatile memory device.

The non-volatile storage device 95 is, for example, a non-volatile storage device such as a read only memory (ROM) and a flash memory, and is capable of storing varieties of programs and data, and the like.

The drive device 96 is, for example, a device processing data reading and writing with a recording medium 97 to be described later.

The recording medium 97 is, for example, an arbitrary recording medium capable of recording data, the recording medium being such as an optical disk, a magneto-optical disk, and a semiconductor flash memory.

For example, each of the example embodiments of the present invention may be achieved in such a way that the data distribution device is configured of the information processing device 90 illustrated in FIG. 17, and that such data distribution device is supplied with a program capable of achieving a function described in each of the above-described example embodiments.

In this case, the arithmetic operation device 93 executes the program supplied to the data distribution device, thus making it possible to achieve the example embodiment. Moreover, it is also possible to configure not all of the data distribution device but a partial function thereof by the information processing device 90.

Moreover, such a configuration may be adopted, in which the above-described program is recorded in the recording medium 97 in advance, and in which the above-described program is stored in the non-volatile storage device 95 in a shipping stage, an operating stage, or the like of the data distribution device. Note that, as a supply method of the above-described program in this case, there may be adopted a method of installing the program in the data distribution device by using an appropriate jig in a manufacturing stage before shipment, the operating stage, or the like. Moreover, the supply method of the above-described program may adopt a general procedure such as a method of downloading the program from the outside through a communication line such as the Internet.

The whole or part of the example embodiments disclosed above can be described as, but not limited to, the following supplementary notes.

(Supplementary Note 1)

A data distribution device comprising:

communication quality measurement means for measuring communication quality of a transmission path to a data receiving device;

hierarchical structure determination means for determining a hierarchical structure of hierarchical data, based on a measurement result of the communication quality;

hierarchical encoding means for generating the hierarchical data having the hierarchical structure by hierarchically encoding input data; and communication means for distributing distribution data in at least a part of layers of the hierarchical data to the data receiving device.

(Supplementary Note 2)

The data distribution device according to Supplementary Note 1, wherein the hierarchical structure determination means determines the hierarchical structure in response to a variation amount of the measurement result of the communication quality.

(Supplementary Note 3)

The data distribution device according to Supplementary Note 1 or 2, wherein the hierarchical structure includes a bit rate of each layer.

(Supplementary Note 4)

The data distribution device according to any one of Supplementary Notes 1 to 3, wherein the hierarchical structure determination means determines the hierarchical structure, based on the measurement result of the communication quality in past, or based on a predicted value of the communication quality in future, the predicted value being predicted from the measurement result.

(Supplementary Note 5)

The data distribution device according to any one of Supplementary Notes 1 to 4, wherein the communication quality includes a communication throughput.

(Supplementary Note 6)

The data distribution device according to any one of Supplementary Notes 1 to 5, wherein, when a piece of the input data is a video, the hierarchical structure determination means determines the hierarchical structure at timing when group of picture (GOP) is switched.

(Supplementary Note 7)

The data distribution device according to any one of Supplementary Notes 1 to 6, further comprising distribution layer determination means for determining the layer to be distributed to the data receiving device, from among the hierarchical data, based on the measurement result of the communication quality.

(Supplementary Note 8)

The data distribution device according to Supplementary Note 7, wherein the distribution layer determination means determines the layer of a bit rate equal to or less than a communication throughput of the transmission path as the layer to be distributed.

(Supplementary Note 9)

A data distribution system comprising:

the data distribution device according to any one of Supplementary Notes 1 to 8; and the data receiving device.

(Supplementary Note 10)

A data distribution method comprising:

measuring communication quality of a transmission path to a data receiving device;

determining a hierarchical structure of hierarchical data, based on a measurement result of the communication quality;

generating the hierarchical data having the hierarchical structure by hierarchically encoding input data; and distributing distribution data in at least a part of layers of the hierarchical data to the data receiving device.

(Supplementary Note 11)

The data distribution method according to Supplementary Note 10, further comprising determining the hierarchical structure in response to a variation amount of the measurement result of the communication quality.

(Supplementary Note 12)

The data distribution method according to Supplementary Note 10 or 11, wherein the hierarchical structure includes a bit rate of each layer.

(Supplementary Note 13)

The data distribution method according to any one of Supplementary Notes 10 to 12, further comprising determining the hierarchical structure, based on the measurement result of the communication quality in past, or based on a predicted value of the communication quality in future, the predicted value being predicted from the measurement result.

(Supplementary Note 14)

The data distribution method according to any one of Supplementary Notes 10 to 13, wherein the communication quality includes a communication throughput.

(Supplementary Note 15)

The data distribution method according to any one of Supplementary Notes 10 to 14, further comprising determining, when a piece of the input data is a video, the hierarchical structure at timing when group of picture (GOP) is switched.

(Supplementary Note 16)

The data distribution method according to any one of Supplementary Notes 10 to 15, further comprising determining the layer to be distributed to the data receiving device, from among the hierarchical data, based on the measurement result of the communication quality.

(Supplementary Note 17)

The data distribution method according to Supplementary Note 16, further comprising determining the layer of a bit rate equal to or less than a communication throughput of the transmission path as the layer to be distributed.

(Supplementary Note 18)

A computer-readable recording medium that records a data distribution program causing a computer to execute:

a communication quality measurement function of measuring communication quality of a transmission path to a data receiving device;

a hierarchical structure determination function of determining a hierarchical structure of hierarchical data, based on a measurement result of the communication quality;

a hierarchical encoding function of generating the hierarchical data having the hierarchical structure by hierarchically encoding input data; and a communication function of distributing distribution data in at least a part of layers of the hierarchical data to the data receiving device.

(Supplementary Note 19)

The computer-readable recording medium recording the data distribution program according to Supplementary Note 18, wherein the hierarchical structure determination function determines the hierarchical structure in response to a variation amount of the measurement result of the communication quality.

(Supplementary Note 20)

The computer-readable recording medium recording the data distribution program according to Supplementary Note 18 or 19, wherein the hierarchical structure includes a bit rate of each layer.

(Supplementary Note 21)

The computer-readable recording medium recording the data distribution program according to any one of Supplementary Notes 18 to 20, wherein the hierarchical structure determination function determines the hierarchical structure, based on the measurement result of the communication quality in past, or based on a predicted value of the communication quality in future, the predicted value being predicted from the measurement result.

(Supplementary Note 22)

The computer-readable recording medium recording the data distribution program according to any one of Supplementary Notes 18 to 21, wherein the communication quality includes a communication throughput.

(Supplementary Note 23)

The computer-readable recording medium recording the data distribution program according to any one of Supplementary Notes 18 to 22, wherein, when a piece of the input data is a video, the hierarchical structure determination function determines the hierarchical structure at timing when group of picture (GOP) is switched.

(Supplementary Note 24)

The computer-readable recording medium recording the data distribution program according to any one of Supplementary Notes 18 to 23, further causing a computer to execute a distribution layer determination function of determining the layer to be distributed to the data receiving device, from among the hierarchical data, based on the measurement result of the communication quality.

(Supplementary Note 25)

The computer-readable recording medium recording the data distribution program according to Supplementary Note 24, wherein the distribution layer determination function determines the layer of a bit rate equal to or less than a communication throughput of the transmission path as the layer to be distributed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-140107, filed on Jul. 19, 2017, the disclosure of which is incorporated herein in its entirety by reference.

REFERENCE SIGNS LIST 10, 20 Data distribution device
11 Communication quality measurement unit
12 Hierarchical structure determination unit
13 Hierarchical encoding unit
14 Communication unit
25 Distribution layer determination unit
40 Data receiving device
41 Communication unit
42 Decoding unit
43 Output unit
44 Feedback information generation unit
50 Network
90 Information processing device
91 Communication interface
92 Input/output interface
93 Arithmetic operation device
94 Storage device
95 Non-volatile storage device
96 Drive device
97 Recording medium

What is claimed is:

1. A data distribution device comprising one or more memories storing instructions and one or more processors configured to execute the instructions to:
   measure communication quality of a transmission path to a data receiving device;
   determine a hierarchical structure of hierarchical data, based on a variation amount of a measurement result of the communication quality;
   generate the hierarchical data having the hierarchical structure by hierarchically encoding input data; and
   distribute distribution data in at least a part of layers of the hierarchical data to the data receiving device, wherein
   when the variation amount is small, a bit rate of each layer of the hierarchical structure is determined more densely than when the variation amount is large.

2. The data distribution device according to claim 1, wherein the one or more processors are configured to execute the instructions to
   determine the hierarchical structure based on the measurement result of the communication quality in a past or based on a predicted value of the communication quality in a future, wherein the predicted value is predicted from the measurement result.

3. The data distribution device according to claim 1, wherein
   the communication quality includes a communication throughput.

4. The data distribution device according to claim 1, wherein the one or more processors are configured to execute the instructions to,
   when a piece of the input data is a video, determine the hierarchical structure at timing when a group of picture (GOP) is switched.

5. The data distribution device according to claim 1, wherein the one or more processors are configured to execute the instructions to
   determine the layer to be distributed to the data receiving device, from among the hierarchical data, based on the measurement result of the communication quality.

6. The data distribution device according to claim 5, wherein
   the layer of a first bit rate equal to or less than a communication throughput of the transmission path is determined as the layer to be distributed.

7. A data distribution method comprising:
   measuring communication quality of a transmission path to a data receiving device;
   determining a hierarchical structure of hierarchical data, based on a variation amount of a measurement result of the communication quality;
   generating the hierarchical data having the hierarchical structure by hierarchically encoding input data; and
   distributing distribution data in at least a part of layers of the hierarchical data to the data receiving device, wherein
   when the variation amount is small, a bit rate of each layer of the hierarchical structure is determined more densely than when the variation amount is large.

8. The data distribution method according to claim 7, wherein
   the hierarchical structure is determined, based on the measurement result of the communication quality in past, or based on a predicted value of the communication quality in future, the predicted value being predicted from the measurement result.

9. The data distribution method according to claim 7, wherein
   the communication quality includes a communication throughput.

10. The data distribution method according to claim 7, wherein
    when a piece of the input data is a video, the hierarchical structure is determined at timing when a group of picture (GOP) is switched.

11. The data distribution method according to claim 7, further comprising
    determining the layer to be distributed to the data receiving device, from among the hierarchical data, based on the measurement result of the communication quality.

12. The data distribution method according to claim 11, wherein
    the layer of a first bit rate equal to or less than a communication throughput of the transmission path is determined as the layer to be distributed.

13. A non-transitory computer-readable recording medium that records a data distribution program causing a computer to execute:
    a communication quality measurement function of measuring communication quality of a transmission path to a data receiving device;
    a hierarchical structure determination function of determining a hierarchical structure of hierarchical data, based on a variation amount of a measurement result of the communication quality;

a hierarchical encoding function of generating the hierarchical data having the hierarchical structure by hierarchically encoding input data; and a communication function of distributing distribution data in at least a part of layers of the hierarchical data to the data receiving device, wherein when the variation amount is small, a bit rate of each layer of the hierarchical structure is determined more densely than when the variation amount is large.

\* \* \* \* \*